United States Patent
Ahmed et al.

(10) Patent No.: US 11,420,770 B2
(45) Date of Patent: Aug. 23, 2022

(54) COLLABORATIVE RELATIONSHIP BETWEEN A UAV AND AN AUTOMOBILE

(71) Applicant: Ford Global Technologies, LLC, Dearborn, MI (US)

(72) Inventors: Nayaz Khalid Ahmed, Canton, MI (US); Phillip Morris, Redford, MI (US); Daniel Boston, Dearborn, MI (US); Ahmed Elhadeedy, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 16/561,644

(22) Filed: Sep. 5, 2019

(65) Prior Publication Data
US 2021/0070471 A1    Mar. 11, 2021

(51) Int. Cl.
*G08G 1/04* (2006.01)
*H04B 7/15* (2006.01)
(Continued)

(52) U.S. Cl.
CPC .............. *B64F 1/364* (2013.01); *B64C 39/02* (2013.01); *G05D 1/0088* (2013.01); *G05D 1/101* (2013.01); *G06V 20/10* (2022.01); *G08G 1/012* (2013.01); *G08G 1/0125* (2013.01); *G08G 1/04* (2013.01); *H04B 7/15* (2013.01); *H04N 5/2253* (2013.01);
(Continued)

(58) Field of Classification Search
CPC .......... B64F 1/364; H04W 4/40; B64C 39/02; B64C 2201/12; B64C 2201/145; B64C 2201/18; G05D 1/0088; G05D 1/101; G06K 9/00664; G08G 1/012; G08G 1/0125; G08G 1/04; H04B 7/15; H04N 5/2253; H04N 7/08
See application file for complete search history.

(56) References Cited

U.S. PATENT DOCUMENTS 9,464,902 B2    10/2016 Isler et al.
9,555,885 B2 *   1/2017 Stanek ................. G05D 1/0276
(Continued)

OTHER PUBLICATIONS

Ford Motor Company, "Ford studies using drones to guide self-driving cars", Phys.Org, Dec. 15, 2016, 6 pages.

*Primary Examiner* — Mathew Franklin Gordon
(74) *Attorney, Agent, or Firm* — Brandon Hicks; Eversheds Sutherland (US) LLP (57) ABSTRACT

Exemplary embodiments described in this disclosure are generally directed to a collaborative relationship between a UAV and an automobile. In a first exemplary method, a data capture system is provided in a UAV. The data capture system may be used to capture data when the UAV is in flight. A first computer in the UAV determines one or more limitations associated with wirelessly transmitting some or all of the data from the UAV to an automobile. The first computer may be further used to withhold wireless transmission of a portion of the data to the automobile due to the one or more limitations. The portion of data is transferred to a second computer in the automobile after landing the UAV on the automobile. In a second exemplary method, the UAV includes a communication relay system for relaying to an automobile, signals received from a satellite or a cellular base station.

20 Claims, 7 Drawing Sheets

(51) Int. Cl.

| | |
|---|---|
| *H04W 4/40* | (2018.01) |
| *B64F 1/36* | (2017.01) |
| *H04N 5/225* | (2006.01) |
| *H04N 7/08* | (2006.01) |
| *G05D 1/00* | (2006.01) |
| *G05D 1/10* | (2006.01) |
| *G08G 1/01* | (2006.01) |
| *B64C 39/02* | (2006.01) |
| *G06V 20/10* | (2022.01) |

(52) U.S. Cl.
CPC ............... *H04N 7/08* (2013.01); *H04W 4/40* (2018.02); *B64C 2201/12* (2013.01); *B64C 2201/145* (2013.01); *B64C 2201/18* (2013.01)

(56) References Cited

U.S. PATENT DOCUMENTS

| | | |
|---|---|---|
| 10,059,467 B2 | 8/2018 | Wang |
| 10,102,586 B1* | 10/2018 | Marlow ................ B64C 39/024 |
| 2017/0139424 A1* | 5/2017 | Li ........................ G06Q 10/083 |
| 2017/0320569 A1* | 11/2017 | Gordon ................ B64C 39/024 |

\* cited by examiner

COLLABORATIVE RELATIONSHIP BETWEEN A UAV AND AN AUTOMOBILE

FIELD OF THE DISCLOSURE

This disclosure generally relates to unmanned aerial vehicles and more particularly relates to systems and methods related to collaborative activities between an unmanned aerial vehicle and an automobile.

BACKGROUND

Unmanned aerial vehicles, or drones, are now being used extensively in a wide variety of applications, such as delivering various articles, inspecting sites and structures after a natural disaster, photography, and videography. Aerial photography and videography provide valuable information that may not be readily acquired through ground-based devices such as hand-held video cameras. A drone can, for example, provide a bird's-eye view of an area that is under flood waters or has been subjected to an earthquake. The drone may be further used to airdrop supplies to stranded people in such areas. As another example, a drone may be used to explore certain areas inside a nuclear power plant in which a nuclear reactor leak has occurred. It may be very hazardous for a human being to attempt to get close to these areas even if it were possible to do so.

Nonetheless, drones have certain constraints and limitations that prevent their use in some types of applications. For example, a drone may have battery limitations that prevent the drone from staying aloft for an extended period of time or fly to a distant destination. Battery technologies are being continuously improved. However, it is impractical to wait for battery technology to improve for carrying out certain types of activities. It is therefore desirable to find alternative solutions where feasible.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods related to interactions between an unmanned aerial vehicle (UAV) and an automobile. In an exemplary method in accordance with the disclosure, a data capture system is provided in a UAV. The data capture system may be used to capture data when the UAV is in flight. A first computer in the UAV determines one or more limitations associated with wirelessly transmitting some or all of the data from the UAV to the automobile. The first computer may be further used to withhold wireless transmission of a portion of the data to the vehicle due to the one or more limitations. The portion of data is transferred to a second computer in the automobile, after landing the UAV on the automobile. In another exemplary method, the UAV includes a communication relay system for relaying to an automobile, signals received from a satellite or a cellular base station.

Illustrative Embodiments

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the words "vehicle" and "automobile" may be used interchangeably in this disclosure and either word can represent a wide variety of vehicles such as, for example, civilian vehicles, military vehicles, autonomous vehicles, and conventional vehicles operated by human drivers. The phrase "data capture system" as used herein refers to various types of devices that may be mounted upon, attached to, or transported in an unmanned aerial vehicle (UAV) for capturing various types of data such as for example, images, sounds, and video footage. Images can include black-and-white images, color images, and infrared images. Furthermore, it should be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Figure 1:
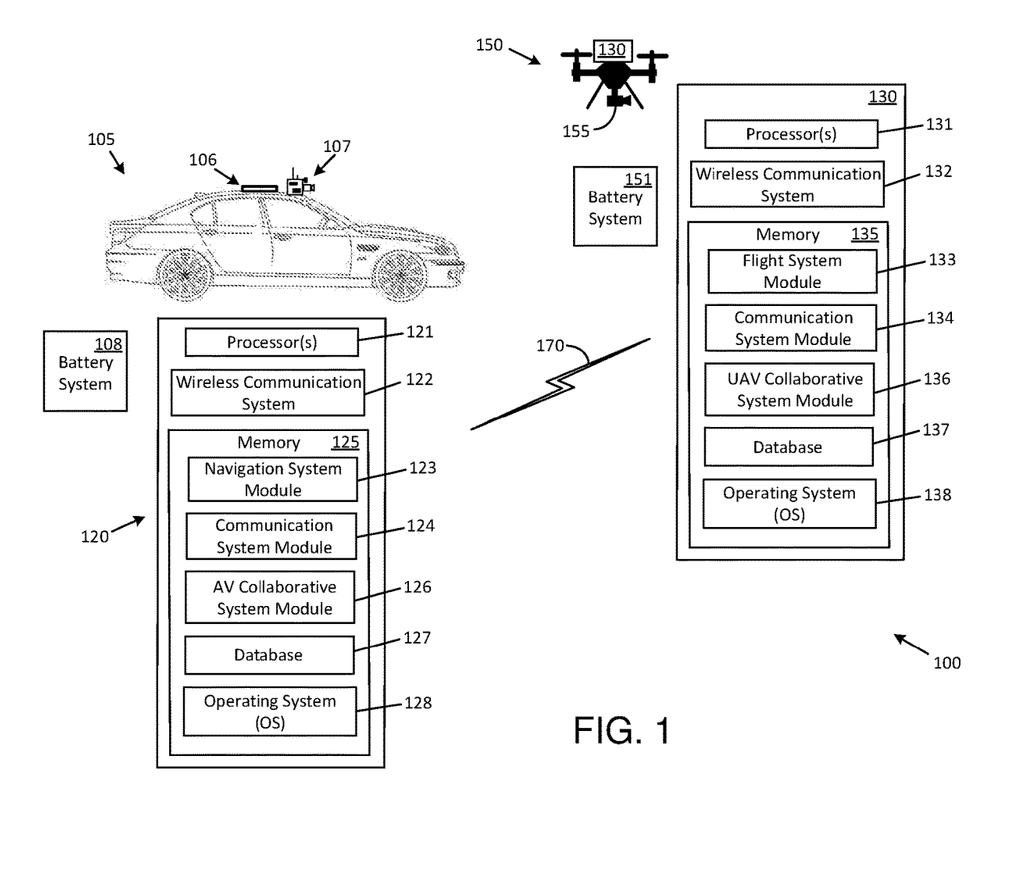
FIG. 1 shows an exemplary system that illustrates a collaborative relationship between an unmanned aerial vehicle (UAV) and a vehicle in accordance with an embodiment of the disclosure.

FIG. 1 shows an exemplary system 100 that illustrates a collaborative relationship between an unmanned aerial vehicle 150 and an automobile 105 in accordance with an embodiment of the disclosure. In the example application illustrated in FIG. 1, the automobile 105 is an autonomous vehicle (AV) 105 that may include various components such as a computer 120 and a sensor system 107. In another example application, the automobile 105 can be a vehicle that is operated by a driver and includes a computer and a sensor system that are substantially similar to the computer 120 and the sensor system 107 (minus some of the elements that are used exclusively for operating the autonomous vehicle 105 in an autonomous manner).

The computer 120 may include several components such as a processor 121 and a memory 125. The memory 125, which is one example of a non-transitory computer-readable medium, may be used to store an operating system (OS) 128, a database 127, and various code modules such as a navigation system module 123, a communication system module 124, and an AV collaborative system module 126. Some of the code modules may be configured to cooperate with various types of hardware provided in the autonomous vehicle 105 for carrying out various operations. For example, the navigation system module 123 may include software that cooperates with various hardware components in the autonomous vehicle 105. A few examples of such hardware may include the sensor system 107 and various other components such as a steering mechanism, an ignition switch, an accelerator, a braking mechanism, and a Global Positioning System (GPS) signal.

The sensor system 107 may include one or more of various devices such as, for example, video cameras, motion detectors, distance sensors, proximity sensors, audio sensors, and light detection and ranging (LIDAR) systems, that may be used by the computer 120 to guide the autonomous vehicle 105 safely through traffic in a city, and may also be used in various applications in accordance with the disclosure.

The communication system module 124 may cooperate with the wireless communication system 122 to allow the autonomous vehicle 105 to communicate with various entities such as the unmanned aerial vehicle 150, another autonomous vehicle (not shown), and/or an internet-enabled device (not shown). The communications may be carried out in various ways, such as via a network (not shown), and by using various types of communication formats such as vehicle-to-everything (V2X), vehicle-to-network (V2N), and dedicated short range communications (DSRC). The wireless communication system 122 can include a transmitter and a receiver configured to provide wireless communications between the autonomous vehicle 105 and the unmanned aerial vehicle 150 over a wireless link 170. The wireless link 170 can be characterized in various ways such as, for example, by a data rate, a frequency bandwidth, and/or an operational spectrum. In one example implementation, the wireless link 170 may employ cellular wireless technologies such as 3G, 4G, or 5G cellular wireless technologies.

The AV collaborative system module 126 may be configured to execute various collaborative operations between the autonomous vehicle 105 and the unmanned aerial vehicle 150. In an exemplary collaborative operation, the wireless communication system 122 receives data transmitted from the unmanned aerial vehicle 150 and passes on the data to the AV collaborative system module 126. The AV collaborative system module 126 may store the received data in the database 127.

The autonomous vehicle 105 may include a platform 106 that can be used for various purposes such as for anchoring the unmanned aerial vehicle 150 to the autonomous vehicle 105, for launching the unmanned aerial vehicle 150 from the autonomous vehicle 105, and/or for landing the unmanned aerial vehicle 150 on the autonomous vehicle 105.

The autonomous vehicle 105 may further include a battery system 108 that is used for providing power to various components in the autonomous vehicle 105 including the computer 120 and the sensor system 107.

The unmanned aerial vehicle 150 may include various components such as a computer 130 and a data capture system 155. The computer 130 may include several components such as a processor 131 and a memory 135. The memory 135, which is another example of a non-transitory computer-readable medium, may be used to store an operating system (OS) 138, a database 137, and various code modules such as a flight system module 133, a communication system module 134, and a UAV collaborative system module 136. Some of the code modules may be configured to cooperate with various types of hardware provided in the unmanned aerial vehicle 150 for carrying out various operations.

For example, the flight system module 133 may include software that cooperates with various types of hardware components in the unmanned aerial vehicle 150 for executing various operations such as flying the unmanned aerial vehicle 150 and landing the unmanned aerial vehicle 150 upon the platform 106. A few examples of such hardware components can include the data capture system 155 and various components (not shown) such as motors, rotors, landing gear, and a GPS system. The data capture system 155 may include one or more of various components such as video cameras, motion detectors, distance sensors, proximity sensors, audio sensors, recording devices, and light detection and ranging (LIDAR) systems that may be used to capture various types of data for various types of applications in accordance with the disclosure.

The communication system module 134 may cooperate with the wireless communication system 132 to allow the unmanned aerial vehicle 150 to communicate with various entities such as the autonomous vehicle 105, a cellular base station (not shown) or a server computer system (not shown). The communications may be carried out in various ways, such as via a network (not shown), and by using various types of communication formats such as vehicle-to-everything (V2X), vehicle-to-network (V2N), and dedicated short range communications (DSRC). The wireless communication system 132 can include a transmitter and a receiver configured to provide wireless communications between the unmanned aerial vehicle 150 and the autonomous vehicle 105, for example.

The UAV collaborative system module 136 may be configured to execute various collaborative operations between the unmanned aerial vehicle 150 and the autonomous vehicle 105. In an exemplary collaborative operation, the wireless communication system 132 transmits data to the wireless communication system 122 in the computer 120 of the autonomous vehicle 105. Some or all of the data, which may include data captured by the data capture system 155, may be stored in the database 137 in some applications.

The unmanned aerial vehicle 150 may include landing gear for use when landing the unmanned aerial vehicle 150 upon the platform 106 on the autonomous vehicle 105 and for taking off from the platform 106 on the autonomous vehicle 105.

The unmanned aerial vehicle 150 may further include a battery system 151 that is used for providing power to various components in the unmanned aerial vehicle 150 including the computer 130 and the data capture system 155. In at least some applications in accordance with the disclosure, the power rating and charge storage capacity of the battery system 151 may be lower than that of the battery system 108 provided in the autonomous vehicle 105. The lower power rating and charge storage capacity may be attributable to various constraints. For example, the unmanned aerial vehicle 150 may have a payload lift capacity that has to accommodate not only the weight of a chassis and motors of the unmanned aerial vehicle 150, but also the weight of the battery system 108 and various accessories such as the data capture system 155 and the computer 130. In at least some applications, the data capture system 155 may draw a significant amount of power from the battery system 151, such as, for example, when the data capture system 155 includes a high-resolution video camera capturing real-time video data over an extended period of time.

Figure 2:
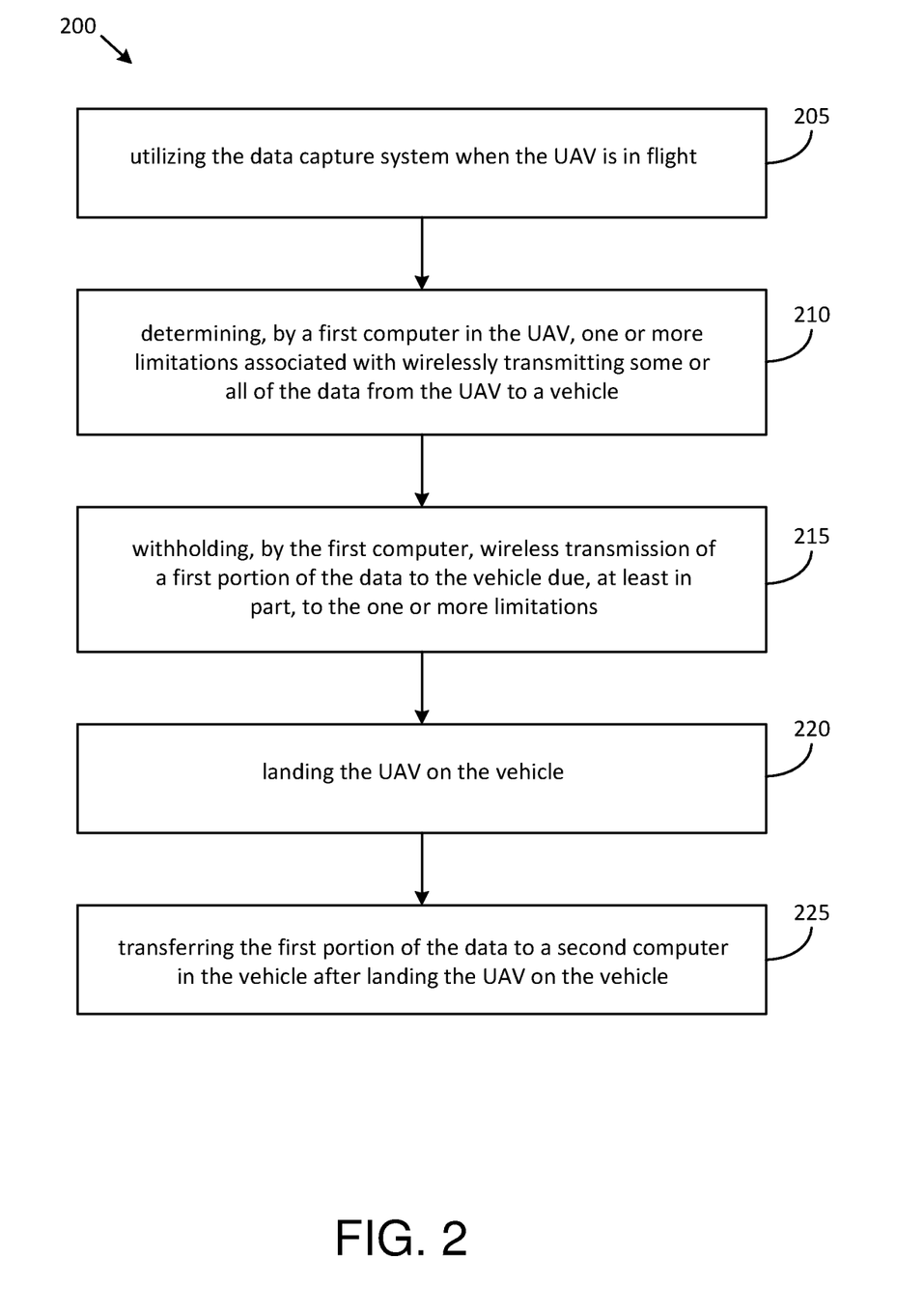
FIG. 2 shows a flowchart that illustrates an exemplary method to execute some aspects of a collaborative relationship between a UAV and a vehicle in accordance with an embodiment of the disclosure.

FIG. 2 shows a flowchart 200 that illustrates an exemplary method to execute some aspects of a collaborative relationship between the UAV 150 and the autonomous vehicle 105, in accordance with an embodiment of the disclosure. The flowchart 200 is also applicable to execute a collaborative relationship between the UAV 150 and a vehicle that is operated by a human driver, in accordance with an embodiment of the disclosure. The flowchart 200 illustrates an exemplary sequence of operations that can be implemented in hardware, software, or a combination thereof. In the context of software, the operations represent computer-executable instructions stored on one or more non-transitory computer-readable media such as the memory 125 and the memory 135, that, when executed by one or more processors such as the processor 121 and the processor 131, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flowchart 200 may be carried out by using the AV collaborative system module 126 and/or by the UAV collaborative system module 136. The operations indicated in the flowchart 200 have been described below by using the system 100 shown in FIG. 1. However, it must be understood that the flowchart 200 may be equally applicable to various other systems involving one or more UAVs and one or more vehicles.

At block 205, the data capture system 155 may be used by the unmanned aerial vehicle 150 to capture data. In an exemplary application, the data capture system 155 may be used by the unmanned aerial vehicle 150 to capture data such as photographs, digital images, video recordings, real-time video, and/or audio recordings pertaining to various objects (roads, buildings, automobiles, etc.) and conditions (traffic congestion, traffic accidents, weather, etc.) in the vicinity of the autonomous vehicle 105.

At block 210, the computer 130 in the unmanned aerial vehicle 150 may be used to determine one or more limitations associated with wirelessly transmitting data from the unmanned aerial vehicle 150 to the autonomous vehicle 105. For example, the computer 130 may be used to determine a transmission bandwidth limitation in the wireless link 170, a data size limitation, a time limitation, and/or a battery limitation, one or all of which may affect the amount of data that can be transmitted from the unmanned aerial vehicle 150 to the autonomous vehicle 105.

The transmission bandwidth limitation in the wireless link 170 may pertain to factors such as, for example, the type of technology used (for example, bandwidth limitations in 3G wireless technology), atmospheric conditions (for example, bad weather that may impact wireless transmission), and a number of users using the wireless link 170 over a period of time. In an exemplary implementation, the computer 130 may determine that one or more of such transmission bandwidth limitations may hamper, restrict, or prevent transmitting from the unmanned aerial vehicle 150 to the autonomous vehicle 105, an entirety of the data captured by the data capture system 155.

The time limitation may pertain to factors such as, for example, a period of time that the unmanned aerial vehicle 150 is airborne, a period of time that the unmanned aerial vehicle 150 has available for carrying out wireless transmissions, and a period of time over which the transmission link 170 is available for use by the unmanned aerial vehicle 150. In an exemplary implementation, the computer 130 may determine that one or more of such time limitations may hamper, restrict, or prevent transmitting from the unmanned aerial vehicle 150 to the autonomous vehicle 105, an entirety of the data captured by the data capture system 155.

The battery limitation may pertain to factors such as for example, a powering capacity of the battery system 151, a usage of the battery system 151, and a remaining amount of charge in the battery system 151. In one exemplary case, the powering capacity of the battery system 151 may be mainly required to power the motors of the unmanned aerial vehicle 150. A flight time of the unmanned aerial vehicle 150 may be adversely affected if the battery system 151 is used for other purposes such as for operating the data capture system 155 and/or the computer 130 (image capture, communicating with the computer 120 in the autonomous vehicle 105, etc.). In another exemplary case, the amount of charge remaining in the battery system 151 after the unmanned aerial vehicle 150 has flown over a certain distance may be inadequate to execute some operations of the data capture system 155 and/or the computer 130. In an exemplary implementation, the computer 130 may determine that one or more of such battery limitations may hamper, restrict, or prevent transmitting from the unmanned aerial vehicle 150 to the autonomous vehicle 105, an entirety of the data captured by the data capture system 155. This data may be stored in the database 137, together with any other data that is desired to be stored by the computer 130.

At block 215, the computer 130 may withhold wireless transmission of some or all of the data that has been obtained by the data capture system 155 and/or stored in the database 137, due to one or more limitations such as those described above. For example, the computer 130 may withhold wireless transmission of some or all of the data that has been obtained by the data capture system 155 due to an inadequate amount of charge being available from the battery system 151 for such purposes. In some cases, the computer 130 may wirelessly transmit a portion of the data that has been obtained by the data capture system 155 and/or stored in the database 137. In some other cases, the computer 130 may withhold wireless transmission of some or all of the data that has been obtained by the data capture system 155 and/or stored in the database 137, due to security concerns. A security concern may arise, for example, if the wireless link 170 is susceptible to interception and/or hacking.

At block 220, the unmanned aerial vehicle 150 lands on the platform 106 of the autonomous vehicle 105. The landing procedure may include, or be followed by automatically coupling one or more cables/connectors to one or more cable/connectors provided in the platform 106 for purposes such as data transfer and for recharging the battery system 108 of the unmanned aerial vehicle 150.

At block 225, some or all of the data that was stored in the database 137 by the computer 130 and left un-transmitted due to at least some of the limitations described above, and/or due to security concerns associated with wireless transmission, can be transferred to the computer 120. The computer 130 may utilize the battery system 108 that is available in the autonomous vehicle 105 for carrying out the data transfer. In at least some cases, the battery system 108 has a power rating and storage capacity that is significantly greater than that of the battery system 151 in the unmanned aerial vehicle 150 and the data transfer can be done in a more efficient manner.

Figure 3:
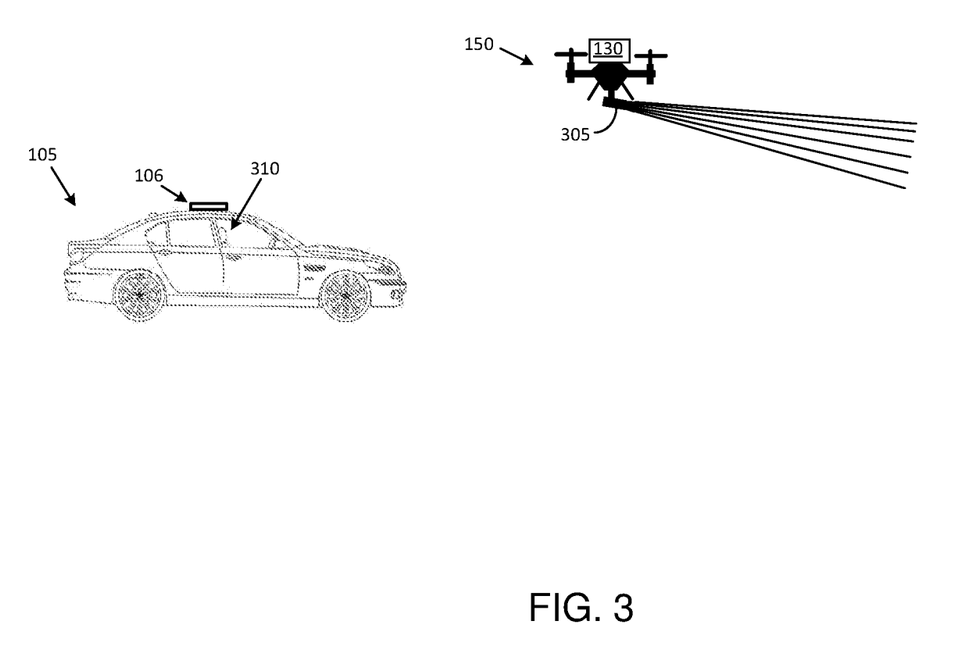
FIG. 3 shows the system that is illustrated in FIG. 1 when used in a first exemplary application in accordance with an embodiment of the disclosure.

FIG. 3 shows the system 100 when used in a first exemplary application in accordance with an embodiment of the disclosure. In this exemplary application, the automobile 105 may be vehicle such as a sport utility vehicle that is operated by a driver 310 and used for driving over unpaved surfaces (off-roading). When doing so, the driver 310 may prefer illuminating a certain amount of area in front of the automobile 105 so as to obtain good visibility at night. However, the headlights and other lights provided in the automobile 105 may be inadequate for the task. In this case, the unmanned aerial vehicle 150 may be configured to fly ahead of the headlights of the automobile 105 and operate a lighting system 305 for illuminating the area that is desired to be illuminated. The lighting system 305, may include, for example, a floodlight attached to a gimbal mount that is coupled to one or more servomotors (not shown) controllable by the computer 130. The driver 310 may configure the illumination pattern and other characteristics of the lighting system 305 to his/her liking, by communicating with the unmanned aerial vehicle 150. The communicating may be carried out in one exemplary case, by using a voice interface (not shown) that is coupled to the computer 120. The computer 120 may respond to various voice commands provided by the driver 310 by using the communication system module 124 to provide bidirectional communications with the communication system module 134 in the computer 130 of the unmanned aerial vehicle 150 (control signals in one direction and status signals in the opposite direction, for example).

Figure 4:
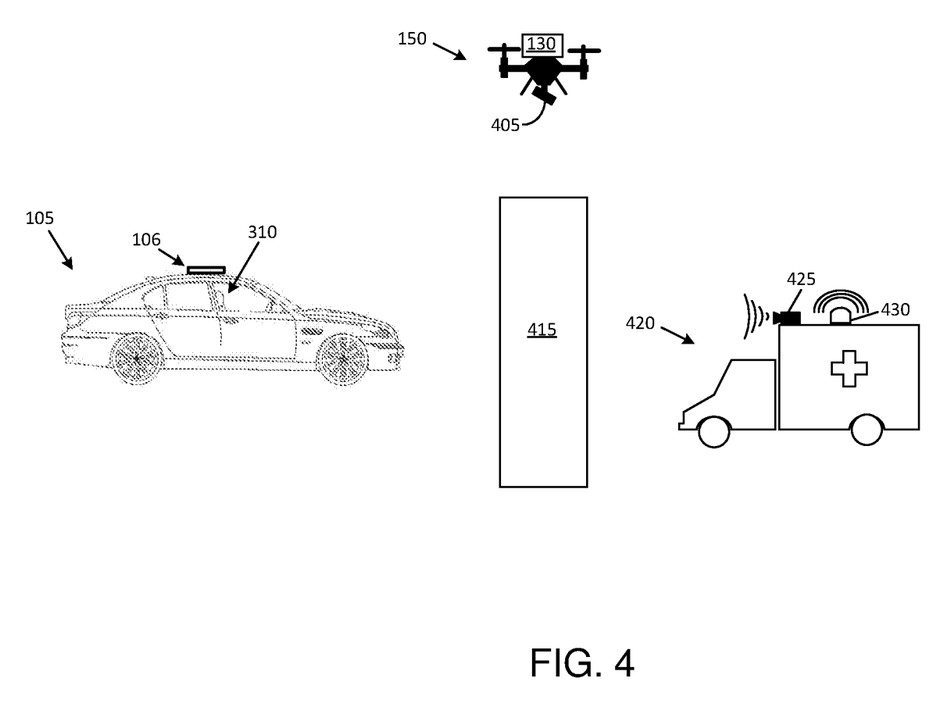
FIG. 4 shows the system that is illustrated in FIG. 1 when used in a second exemplary application in accordance with an embodiment of the disclosure.

FIG. 4 shows the system 100 when used in a second exemplary application in accordance with an embodiment of the disclosure. In this exemplary application, the vehicle 105 is operated by the driver 310 to drive on a road in an urban area having various structures such as a building 415. The building 415 obscures a line-of-sight of the driver 310 with respect to an oncoming emergency vehicle 420 (such as a hospital ambulance or a police car). Furthermore, in some situations, the driver 310 may be unable to hear the sound of a siren 425 mounted upon the emergency vehicle 420. In this exemplary application, the unmanned aerial vehicle 150 may be configured to fly ahead of the vehicle 105 and operate a sensor system 405 for detecting a presence of the emergency vehicle 420.

The sensor system 405 may include an audio transducer for detecting sound emitted by the siren 425 and an imaging system for capturing images and/or video of the emergency vehicle 420. In one case, the UAV collaborative system module 136 in the computer 130 may analyze various sounds received by the audio transducer (including traffic-related sounds such as made by car engines and car horns) and analyze these sounds (filtering, pattern matching etc.) to detect the sound emitted by the siren 425 of the emergency vehicle 420. In another case, the UAV collaborative system module 136 in the computer 130 may be used to analyze images captured by the imaging system (including headlights on other vehicles, traffic lights, and lights on various structures and building) for identifying a characteristic light pattern that is produced by a warning light 430 in the emergency vehicle 420.

The computer 130 in the unmanned aerial vehicle 150 may inform the computer 120 in the vehicle 105 of the oncoming emergency vehicle 420 based on detecting the sound produced by the siren 425 and/or based on detecting the characteristic light pattern produced by the warning light 430. In an exemplary implementation, the computer 130 in the unmanned aerial vehicle 150 may also determine whether a travel path of the emergency vehicle 420 has any impact upon a travel path of the vehicle 105. If the travel path of the emergency vehicle 420 has no impact upon a travel path of the vehicle 105, the computer 130 may refrain from informing the computer 120 in the vehicle 105 of the oncoming emergency vehicle 420. However, if the travel path of the emergency vehicle 420 is expected to have an impact upon a travel path of the vehicle 105, the computer 120 may inform the driver 310 of the emergency vehicle 420. The driver 310 can take responsive action (such as pulling off to one side of the road) even before the siren 425 is heard and/or the obscured emergency vehicle 420 comes into view of the driver 310.

In another exemplary application, the unmanned aerial vehicle 150 may fly to a location for using the sensor system 405 to assess a size of a crowd, gathered, for example, at the site of an accident towards which the emergency vehicle 420 is headed. The crowd size information may be conveyed by the unmanned aerial vehicle 150 to the computer 120 in the vehicle 105.

In yet another exemplary application, the unmanned aerial vehicle 150 may fly to a location for using the sensor system 405 to assess a wait time associated with a line assembled in front of a movie theater, for example. The wait time information may be conveyed by the unmanned aerial vehicle 150 to the computer 120 in the vehicle 105.

Figure 5:
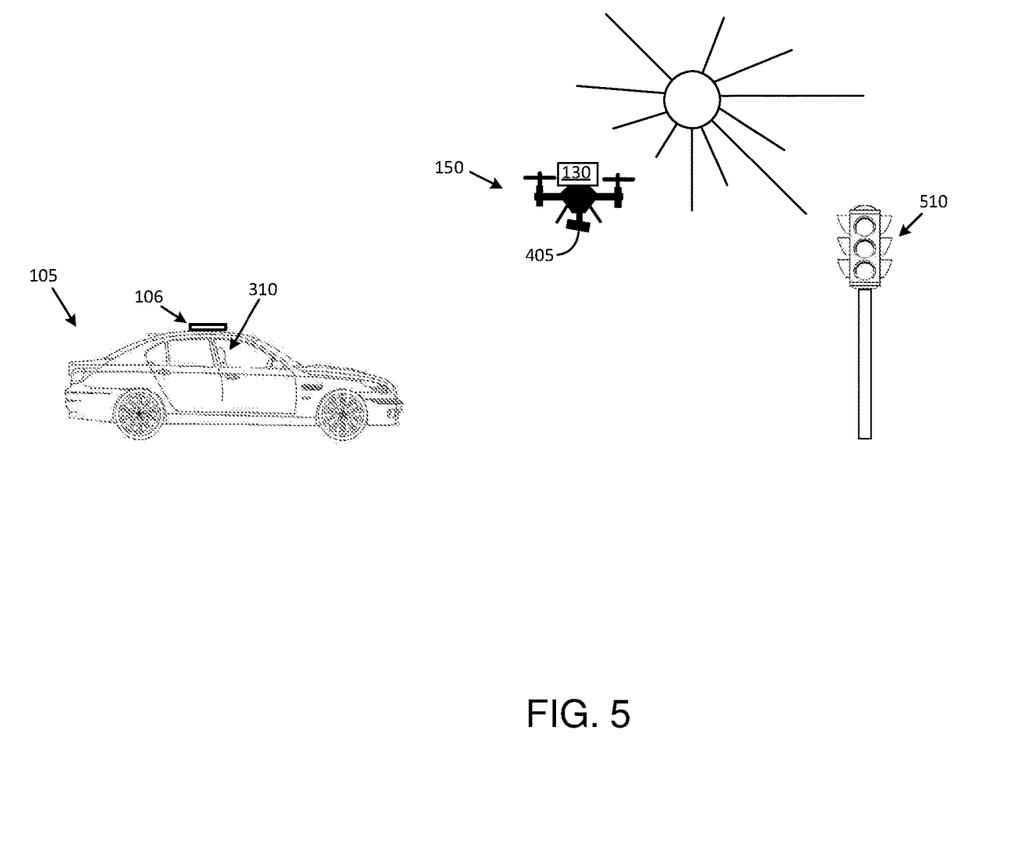
FIG. 5 shows the system that is illustrated in FIG. 1 when used in a third exemplary application in accordance with an embodiment of the disclosure.

FIG. 5 shows the system 100 when used in a third exemplary application in accordance with an embodiment of the disclosure. In this exemplary application, the automobile 105 is operated by the driver 310 driving down a road in an urban area having traffic lights. The driver 310 may be unable to identify a signal condition indicated by an exemplary traffic light 510 (red light on, green light on, etc.) because of various factors such as, for example, an obstruction ahead (overhead cable for example), sunlight affecting the eyesight of the driver 310, and/or sunlight producing glare in the traffic light 510.

In this exemplary application, the unmanned aerial vehicle 150 may be configured to fly ahead of the vehicle 105 and operate the sensor system 405 for detecting a signal condition of the traffic light 510. The sensor system 405 may include elements such as an imaging system that can be used to capture images and/or real-time video of the traffic light 510. The computer 130 may analyze the images and/or video captured by the imaging system and determine a first condition of the traffic light 510 at a first instant in time, a second condition of the traffic light 510 at a second instant in time, and/or a third expected condition of the traffic light 510 when the vehicle 105 reaches an intersection at which the traffic light 510 is located.

The computer 130 in the unmanned aerial vehicle 150 may inform the computer 120 in the vehicle 105 of the third expected condition of the traffic light 510 prior to the vehicle 105 reaching the intersection and/or at the time of reaching the intersection and the computer 120 may pass on this information to the driver 310. The driver 310 may use the information to safely negotiate the intersection.

In another exemplary scenario, the unmanned aerial vehicle 150 may be configured to fly ahead of the vehicle 105 and operate the sensor system 405 for scouting purposes. An exemplary scouting operation can include detecting hazards associated with a sudden change in lighting conditions as would occur if the vehicle 105 were to enter a dark tunnel during a sunny day. Upon entering such a tunnel ahead of the vehicle 105, the unmanned aerial vehicle 150 may modify the operation of one or more components of the sensor system 405. For example, an imaging system may be automatically adjusted to adapt to an abrupt reduction in light level when the unmanned aerial vehicle 150 enters the tunnel and to prepare for an abrupt increase in light level when the unmanned aerial vehicle 150 exits out of the tunnel (into sunlight, for example). Information pertaining to the light level adjustments and any other adjustments carried out by the unmanned aerial vehicle 150 may be conveyed to the sensor system 107 (if the vehicle 105 is an autonomous vehicle) and/or to an occupant (such as a driver) of the vehicle 105 (if the vehicle 105 is operated by a driver) so as to prepare the sensor system 107 and/or to alert the driver about the tunnel and associated conditions.

Figure 6:
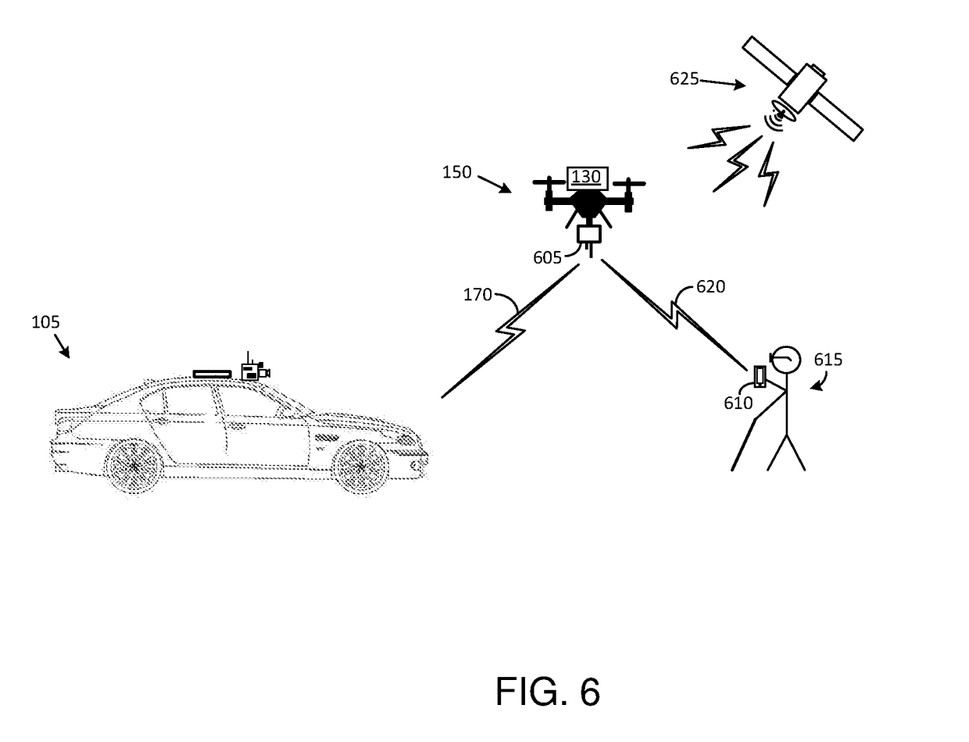
FIG. 6 shows the system that is illustrated in FIG. 1 when used in a fourth exemplary application in accordance with an embodiment of the disclosure.

FIG. 6 shows the system 100 when used in a fourth exemplary application in accordance with an embodiment of the disclosure. In this exemplary application, the automobile 105 is an autonomous vehicle 105 and the unmanned aerial vehicle 150 is equipped with a pedestrian guidance system 605. The pedestrian guidance system 605 may be used for various purposes such as to assist a pedestrian 615 who is physically handicapped reach the autonomous vehicle 105 to undertake a ride, to assist the pedestrian 615 exit the autonomous vehicle 105, and/or guiding the pedestrian 615 from the autonomous vehicle 105 to a destination.

The pedestrian guidance system 605 may include wireless communication circuitry that not only supports use of the wireless link 170 to communicate with the computer 120 in the autonomous vehicle 105 but also supports the use of another wireless link 620. The wireless link 620 allows the pedestrian guidance system 605 to cooperate with the computer 130 in the unmanned aerial vehicle 150 to communicate with a handheld device 610 held by the pedestrian 615 (a smartphone or a tablet computer, for example). In one exemplary case, the pedestrian 615 is a visually impaired person who cannot see the autonomous vehicle 105 and requires oral instructions to reach the autonomous vehicle. The pedestrian guidance system 605 may use a global positioning satellite (GPS) 625 to determine a location of the autonomous vehicle 105 and a location of the pedestrian 615 and use such location information to provide oral instructions to help the pedestrian 615 reach the autonomous vehicle 105. In another exemplary case, the unmanned aerial vehicle 150 may fly in front of the pedestrian 615 and guide the pedestrian 615 to the autonomous vehicle 105 (or from the autonomous vehicle 105 to a destination desired by the pedestrian 615).

Figure 7:
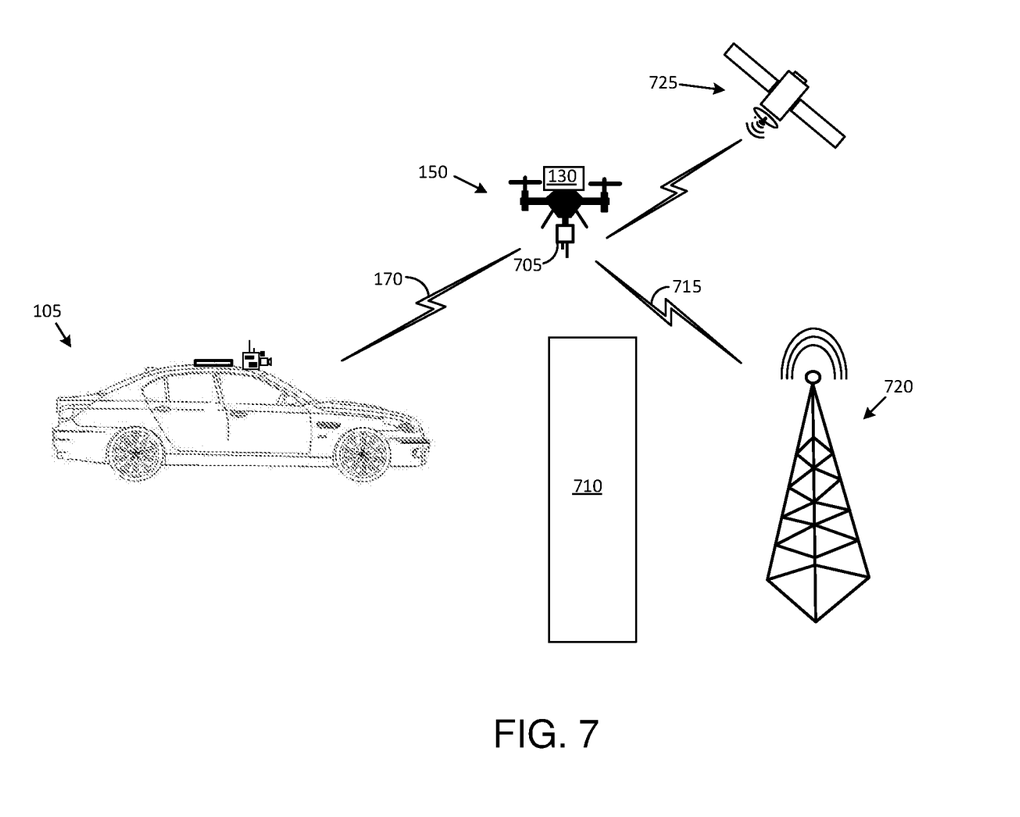
FIG. 7 shows the system that is illustrated in FIG. 1 when used in a fifth exemplary application in accordance with an embodiment of the disclosure

FIG. 7 shows the system 100 when used in a fifth exemplary application in accordance with an embodiment of the disclosure. In one exemplary implementation, the automobile 105 can be either an autonomous vehicle 105 or a vehicle that is operated by the driver 310 (not shown). In this exemplary application, the unmanned aerial vehicle 150 is equipped with a communication relay system 705 that is used to relay data between a cellular base station 720 (or any such wireless apparatus) and the wireless communication system 122 in the computer 120 of the automobile 105. The relaying operation may be desirable in certain situations where one or more objects (such as a building 710) and/or weather conditions interfere with signal transmissions between the cellular base station 720 and the computer 120.

In some cases, the communication relay system 705 may receive signals from the cellular base station 720 via a wireless link 715 in a first communication format and relay the signals to the wireless communication system 122 in a second communication format without modification of the contents of the signals. A similar procedure can be used for signals transmitted by the wireless communication system 122 to the cellular bases station 720.

In some other cases, the communication relay system 705 may receive signals from the cellular base station 720 via the wireless link 715, process the messages and relay the signals to the wireless communication system 122 in a modified form. For example, the communication relay system 705 may receive signals from the cellular base station 720 in an encoded format, decode the messages, and transmit the decoded content of the messages to the wireless communication system 122 in a modified form (as text messages, for example). A similar procedure can be used for signals transmitted by the wireless communication system 122 to the cellular bases station 720.

In another exemplary implementation, the communication relay system 705 may be used to relay data between a satellite 725 and the wireless communication system 122 in the computer 120 of the vehicle 105, particularly in situations where one or more objects (such as a building 710) and/or weather conditions interfere with signal transmissions between the satellite 725 and the computer 120. The satellite 725 can be a GPS satellite and the communication relay system 705 may be used to relay GPS signals to the autonomous vehicle 105, when the vehicle 105 is located in an area where the GPS signals cannot be directly received by the wireless communication system 122 in the computer 120 (a downtown area with tall buildings, for example).

In yet another exemplary implementation, the communication relay system 705 may be used to relay information related to the Internet when Internet connectivity is lost in the automobile 105. In this case, the unmanned aerial vehicle 150 may be configured to fly to a spot where Internet signals can be received and the communication relay system 705 used to provide information derived from the Internet signals to the automobile 105. The information may include, for example, weather information, flight time information, and/or traffic information.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 125 and the memory 135, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Fur- That which is claimed is:

1. A method comprising:
   providing a data capture system and a lighting system in an unmanned aerial vehicle (UAV);
   utilizing the data capture system to capture data when the UAV is in flight, wherein, when the UAV is in flight, the lighting system is configured for illuminating a selected area, and wherein at least an illumination pattern of the lighting system is predefined by a user;
   determining, by a first computer in the UAV, one or more limitations associated with wirelessly transmitting some or all the data from the UAV to a vehicle;
   withholding, by the first computer, wireless transmission of a first portion of the data to the vehicle due, at least in part, to the one or more limitations or due to a security concern;
   landing the UAV on the vehicle; and
   transferring the first portion of the data to a second computer in the vehicle after landing the UAV on the vehicle,
   wherein the UAV further comprises a pedestrian guidance system, and wherein the UAV is configured to cooperate with a handheld device of a pedestrian for providing guidance to the pedestrian to reach the vehicle.

2. The method of claim 1, wherein the one or more limitations associated with wirelessly transmitting the data from the UAV to the vehicle comprise at least one of a transmission bandwidth limitation, a data size limitation, a time limitation, or a battery limitation.

3. The method of claim 2, further comprising:
   wirelessly transmitting, by the first computer to the vehicle, a second portion of the data prior to landing the UAV on the vehicle.

4. The method of claim 2, wherein determining, by the first computer in the UAV, one or more limitations associated with wirelessly transmitting some or all the data from the UAV to the vehicle comprises:
   setting a threshold for each of the transmission bandwidth limitation, the data size limitation, the time limitation, and the battery limitation; and
   comparing the transmission bandwidth limitation, the data size limitation, the time limitation, and the battery limitation to the threshold.

5. The method of claim 2, wherein the data capture system comprises at least one of a sensor, an imaging device, or a recording device, and wherein the vehicle is an autonomous vehicle.

6. The method of claim 5, wherein the first portion of the data comprises at least one of an image captured by the imaging device or a video recording captured by the recording device.

7. A method comprising:
   providing, a communication relay system and a lighting system in an unmanned aerial vehicle (UAV);
   placing the UAV in flight, wherein, when the UAV is in flight, the lighting system is configured for illuminating a selected area, and wherein at least an illumination pattern of the lighting system is predefined by a user;
   receiving, in the communication relay system of the UAV, from one of a satellite or a cellular base station, at least a first signal; and
   relaying, by the communication relay system of the UAV, to a vehicle, at least one of the first signal or a first message that is generated by utilizing the first signal,
   wherein the UAV further comprises a pedestrian guidance system, and wherein the UAV is configured to cooperate with a handheld device of a pedestrian for providing guidance to the pedestrian to reach the vehicle.

8. The method of claim 7, wherein the first signal is a global position system (GPS) signal and the first message is a navigation instruction that is generated by utilizing the GPS signal.

9. The method of claim 8, further comprising:
   providing, a data capture system in the UAV;
   utilizing the data capture system to capture data when the UAV is in flight;
   determining, by a first computer in the UAV, one or more limitations associated with wirelessly transmitting some or all the data from the UAV to the vehicle;
   withholding, by the first computer, wireless transmission of a first portion of the data to the vehicle;
   landing the UAV on the vehicle; and
   transferring, to a second computer in the vehicle, after landing the UAV on the vehicle, the first portion of the data.

10. The method of claim 9, wherein the vehicle is an autonomous vehicle and wherein the data captured by the data capture system comprises at least one of an image or a video recording.

11. The method of claim 10, wherein the one of the image or the video is associated with detecting an emergency situation or a crowd condition that is not within a line of sight of the vehicle.

12. An unmanned aerial vehicle (UAV) comprising:
   a lighting system configured to illuminate a selected area when the UAV is in flight, and wherein at least an illumination pattern of the lighting system is predefined by a user;
   a data capture system configured to capture data when the UAV is in flight;
   a first computer comprising at least one memory that stores computer-executable instructions, the first computer configured to access the at least one memory and execute the computer-executable instructions to at least:
      determine one or more limitations associated with wirelessly transmitting some or all the data from the UAV to a vehicle;
      withhold wireless transmission of a first portion of the data to the vehicle; and transfer, to a second computer in the vehicle, the first portion of the data after the UAV has landed on the vehicle, wherein the UAV further comprises a pedestrian guidance system, and wherein the UAV is configured to cooperate with a handheld device of a pedestrian for providing guidance to the pedestrian to reach the vehicle.

13. The UAV of claim 12, wherein the data capture system comprises at least one of a sensor, an imaging device, or a recording device, and wherein the vehicle is an autonomous vehicle.

14. The UAV of claim 13, wherein the sensor is an image sensor configured to capture at least one of an image or a video detecting an emergency situation or a crowd condition that is not within a line of sight of the vehicle.

15. The UAV of claim 14, wherein the UAV further includes a wireless transceiver configured to transmit the at least one of the image or the video to the autonomous vehicle.

16. The UAV of claim 15, wherein the sensor is an audio transducer configured to detect an audible signal emitted by an emergency vehicle not within the line of sight of the autonomous vehicle and wherein the wireless transceiver is further configured to transmit to the autonomous vehicle, a message indicative of a presence of the emergency vehicle.

17. The UAV of claim 15, wherein the wireless transceiver is further configured to transmit to the autonomous vehicle, a second portion of the data prior to the UAV landing on the vehicle.

18. The UAV of claim 12, wherein the first computer in the UAV is configured to cooperate with the second computer to operate the lighting system for illuminating a portion of a travel path of the autonomous vehicle.

19. The UAV of claim 12, wherein the vehicle is an autonomous vehicle, and wherein the first computer in the UAV is configured to cooperate with a third computer in the handheld device of the pedestrian for providing guidance to the pedestrian to reach the autonomous vehicle.

20. The UAV of claim 12, wherein the vehicle is an autonomous vehicle and the UAV further comprises a communication relay system, the communication relay system configured to receive from one of a satellite or a cellular base station, at least a first signal and relay to the autonomous vehicle, at least one of the first signal or a first message that is generated by utilizing the first signal.

* * * * *